May 5, 1931.  H. V. NYE  1,804,180

MOTOR CONTROL SYSTEM

Original Filed April 13, 1925

Inventor
H. V. Nye
by
Attorney

Patented May 5, 1931

1,804,180

UNITED STATES PATENT OFFICE

HENRY V. NYE, OF WEST ALLIS, WISCONSIN, ASSIGNOR TO ALLIS-CHALMERS MANUFAC-
TURING COMPANY, OF MILWAUKEE, WISCONSIN, A CORPORATION OF DELAWARE

MOTOR CONTROL SYSTEM

Application filed April 13, 1925, Serial No. 22,616. Renewed November 29, 1929.

This invention relates in general to motor control systems, and has more particular relation to the control of alternating current motors, especially such motors of the induction type.

In the case of a motor driving a mill, or a plurality of mills, such as rubber mills or the like, it is especially desirable to be able to stop the mill and the motor in a very short space of time, especially in case of an accident to an employee of the mill. Clutches and brakes have been used to a considerable extent in connection with mill driving motors; but the use of such apparatus involves considerable operating and maintenance difficulty and expense which it is quite desirable to avoid, if possible.

The present invention contemplates an improved system of motor control especially adapted to the control of alternating current induction motors and which provides for the ready starting and stopping of the motor, the stopping being readily accomplished without necessity for auxiliary brakes or the like, and the control of the motor for the purpose of stopping the same being readily effected from a point adjacent or convenient to an employee working at the mill or other machine driven by the motor. The invention further contemplates a control system of such a character as to produce dynamic braking of the motor and the interlocking of the elements of the control system for the motor in such a manner as to insure and necessitate at all times only those operations and the sequence thereof as are desirable and required.

It is an object of this invention to provide an improved system of motor control, especially adapted for the control of alternating current induction motors, and utilizing the dynamic braking effect of the motor for stopping the latter in a relatively short interval of time, and embodying features of control for insuring the necessary and desired sequence of operations in the control of the motor.

These and other objects and advantages are attained by the present invention, various novel features of which will be apparent from the description herein and the accompanying drawings, disclosing embodiments of the invention, and will be more particularly pointed out in the claims.

Figure 1:
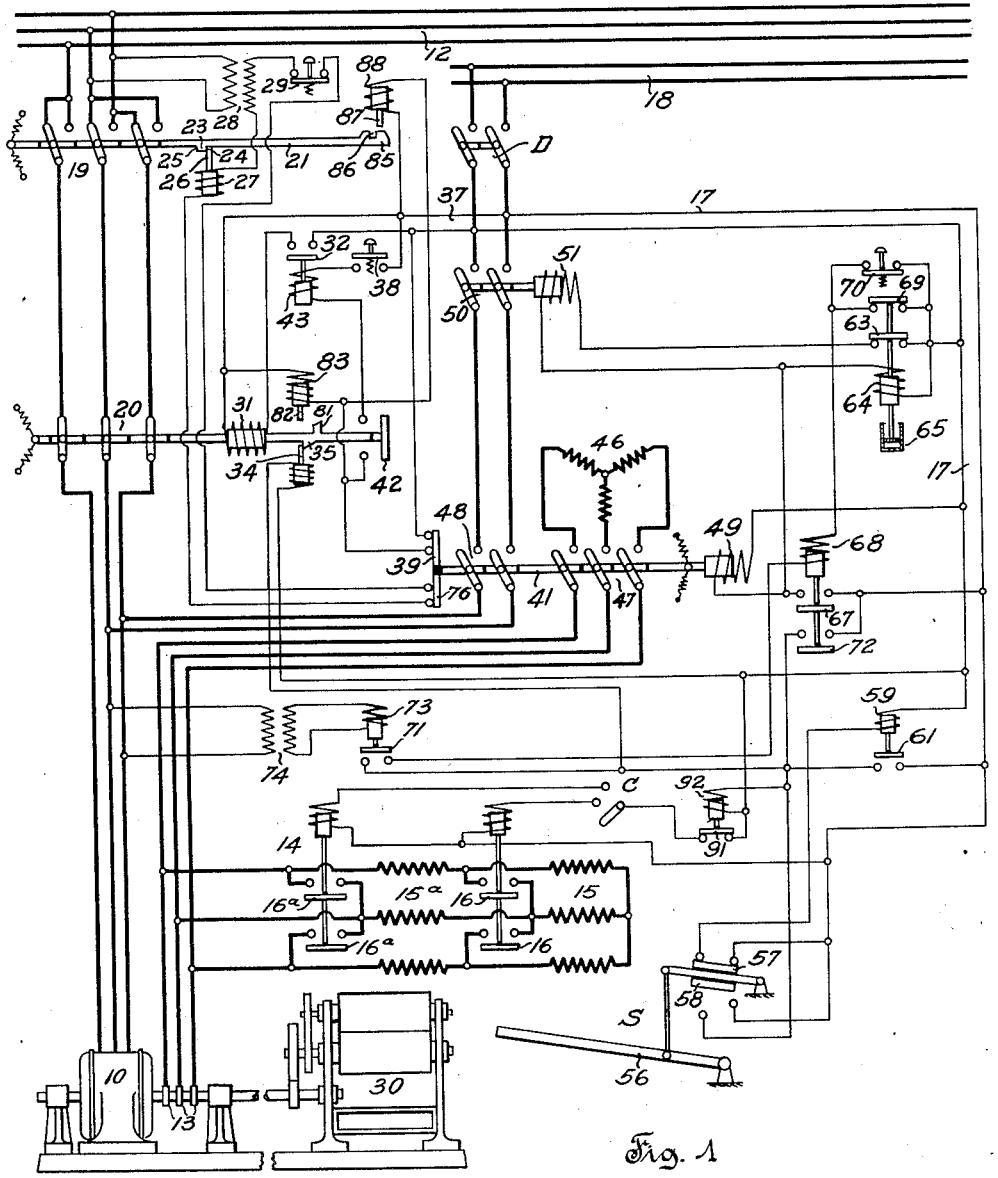
Fig. 1 is a diagrammatic disclosure of a motor driven mill and a control system therefor embodying features of the present invention.

As shown in the drawings, an induction motor 10 may have the winding of its stator supplied with alternating current from a supply circuit 12, and it may have the winding of its secondary or induced element connected, through slip rings 13, with a controlling resistance device 14, to be used especially for starting purposes, and, if desired, for securing variable speed operation of the motor under normal conditions. The resistance device 14 is disclosed as comprising a three-phase resistance in a plurality of sections of any desired number, 15, 15a, and contactor switches 16, 16a which are operable to short circuit the resistance sections 15, 15a, respectively. These contactors are preferably electromagnetically actuated, the circuit through the windings of the actuating electromagnets being preferably controlled through a controlling device C, here indicated as being hand operated, the circuit through the controlling device and operating electromagnets being supplied, through a circuit 17, from the direct current supply circuit 18, through a controlling switch D and necessary and suitable connecting circuits, the connection being either direct or with certain control features to be described hereinafter.

The connection between the alternating current supply line 12 and the stator or primary winding of the motor 10 may be through a reversing switch or circuit-breaker 19 and an additional single-throw controlling switch or circuit-breaker 20. The switch or circuit-breaker 19 may have an "open" position intermediate two "closed" positions, and it is effective, in the position shown, to connect the motor to the supply line for operation in normal direction. The circuit-breaker 19 is normally biased to open position, as by a spring, associated with the operating rod 21 of the circuit-breaker; and the circuit-breaker may be held or latched in either of its closed positions through the cooperation between a stop or projection 23 on the operating rod and having spaced shoulders 24 and 25, and a latch 26 cooperative with the shoulder 25 to hold the circuit-breaker latched in the closed position indicated, and further cooperative with the shoulder 25 to hold the circuit-breaker latched in its other closed position. As indicated, the latch 26 is actuated to and held in effective latching position with respect to the shoulders 24 and 25 on the stop or projection 23 by an electromagnet whose winding 27 is supplied through a voltage transformer 28 and a push-button actuated contactor 29 biased to closed position, from one phase of the supply circuit 12. As will be apparent, on the occurrence of a predetermined low voltage on the supply circuit 12, or through actuation of the push-button 29, the winding 27 of the operating electromagnet of the latch 26 is deenergized, and the circuit-breaker is permitted to move to open position. The operation of the switch or circuit-breaker 19 to either of its closed positions may be manual, as generally suggested herein, or it may be in response to any desired form of automatic operation.

The motor 10 is disclosed herein as driving one or more of a series of machines or mills 30 which may well be considered as rubber or other grinding mills.

The single-throw control switch or circuit-breaker 20 is biased to open position by a spring, as indicated, or other suitable means, and is operable to closed position by an electromagnet having an energizing winding 31 supplied from the D. C. supply line 18 through a contactor 32, normally biased to open position and moved to closed position as will be explained hereinafter. The circuit-breaker 20 is held in closed position, as indicated, through the cooperation of an electromagnetically actuated latch 34 with a projection or stop 35 on the operating rod of the circuit-breaker. This holding latch is biased to inoperative position and is maintained in desired operative relation with the stop 35 when the electromagnet is energized, the energizing circuit of this electromagnet being supplied, through switch D, from the direct current supply circuit 18, as will be described more in detail hereinafter.

The means disclosed for effecting closure of the circuit-breaker 20, and the consequent completion of the motor circuit includes a starting control circuit 37 supplied from the D. C. supply circuit 18 and including a push-button control switch 38 biased to open position, a contactor 39, preferably in the form of an auxiliary switch carried by or actuated by the operating rod 41, and a second contactor 42 carried by or actuated by the operating rod of the switch 20, this contactor 42 being in "open" position when the circuit-breaker 20 is closed. This starting circuit 37 further includes the energizing winding 43 of the electromagnet which is effective to actuate the contactor 32 to closed position.

With the apparatus and control devices as described hereinabove, the motor 10 may be started and stopped in accordance with the ordinary methods of starting and stopping motors of this general class. With the switch or circuit breaker 19 in closed position corresponding to the desired direction of operation of the motor 10 and held in such closed position by the low voltage latch 26, the switch or circuit breaker 20 can be actuated to closed position by operation of the push-button 38 to closed position, such actuation of the push-button completing the circuit of the energizing winding 43 of the electromagnet which actuates the contactor 32, through the auxiliary switch 39, the latter being at this time in the closed position indicated, and the auxiliary switch 42 which is in closed position when the circuit breaker 20 is open. Closure of the contactor 32 through this operating electromagnet completes the energizing circuit 31 of the operating electromagnet for the circuit breaker 20, the latter being thus moved into closed position and the auxiliary switch 42 being moved into open position, as indicated. The circuit breaker 20 is held in closed position by the electromagnetically operated latch 34. With the primary circuit of the motor thus completed, the controller C may be actuated to short-circuit, through the contactors 16, 16a, any desired number of the resistance sections 15, 15a, respectively, thus bringing the motor 10 up to the desired operating speed.

An electrical load circuit, in the form of a braking resistance 46, is connectible, through a single-throw switch 47, to the secondary circuit of the motor 10; and the primary circuit of the motor is connectible through a single-throw switch 48 to the D. C. supply circuit 18. The switches 47 and 48 are disclosed as being operable by the common operating rod 41 with which the auxiliary switch 39 is associated. The arrangement of this operating rod 41 relative to the switches 47 and 48 is such that the switches 47 and 48 are biased to open position, as by means of a spring, associated with the operating rod, and the switches are movable to closed position by an electromagnet associated with the operating rod and having an energizing winding 49. The circuit between the switch 48 and the supply circuit 18 may be opened or closed at will through a switch 50, preferably biased to open position and actuatable to closed position by an electromagnet having an energizing winding 51. Either or both of the switches 48 and 50 may be provided with resistances which are put into circuit when these switches are in open position, such resistances being capable of acting as field-discharge resistances when the direct current circuit through the primary winding is interrupted by either of said switches.

Through the field switches 48 and 50, controlling the connection of the primary winding of the motor, or one phase thereof, as indicated, to the direct current supply circuit, and the switch 47 controlling the connection of the secondary of the motor to the braking resistance load 46, it is possible to convert the induction motor into an alternating current generator for the purpose of effectively braking the same in a relatively short time. The details of the control system are such as to insure that the operation of the closure of the braking control circuits may be effected only when the primary windings of the induction motor is disconnected from the A. C. supply line 12.

A controlling device S, for purposes of insuring the maximum of safety to an operator working at the mill 30, is provided and includes an actuating lever 56 preferably located so as to be conveniently actuated by the hand or foot of an operator in the vicinity of the mill 30, removed or remote to some degree from the motor and the main operating features of the control system. This actuating lever 56 is connected through a rod, or other suitable means, to contactors 57 and 58 which are mounted together for movement about a common pivot, as indicated. The normal position of these parts during operation of the motor 10 and mill driven thereby is as indicated, wherein contactor 57 is in closed position and the contactor 58 in open position. Contactor 57, in closed position, completes the energizing circuit of a winding 59 of an electromagnet which serves, when energized, to hold contactor 61 in open position. This contactor 61 controls the energizing circuit of the electromagnetically actuated latch 34 which holds circuit-breaker 20 in closed position; and it will be apparent that any operation of the actuating lever 56 which serves to open contactor 57 and consequently deenergize the actuating electromagnet of contactor 61, will serve to cause opening of circuit-breaker 20 the consequent stoppage of the motor 10.

A contactor 63 is operable to open position by an electromagnet having an energizing winding 64 and means for retarding the opening movement of the contactor, this retarding means being shown in the form of a dash pot 65. The contactor 63, when in closed position, completes one side of the energizing circuit of the winding 51. A contactor 67, biased to open position, is operable to closed position by an electromagnet having an energizing winding 68, one side of the circuit through this winding being completed through a contactor 69 biased to closed position and associated with the contactor 63 for operation to open position at the same time as the contactor 63 and by the same operating electromagnet, the circuit through the contactor 69 having a parallel branch controlled by a push-button contactor 70 biased to closed position. The other side of the circuit supplying the energizing winding 68 may be closed through a contactor 71 when in closed position and the contactor 58 of the safety device, when such contactor is in closed position, or the contactor 61, when the latter has dropped to closed position through deenergization of its holding electromagnet by opening of the contactor 57, or through the contactor 72, associated with the contactor 67, when moved to closed position through energization of the winding 68.

The contactor 71 is normally held in open position during operation of the motor 10 by an electromagnet having an energizing winding 73 supplied, through a potential transformer 74, from the supply circuit of the motor, preferably between the latter and the circuit-breaker 20.

As indicated, the energizing winding for the electromagnet latch 26 associated with the circuit-breaker 19 may be completed through a contactor or auxiliary switch 76 associated with or actuated by the operating rod 41, so that the circuit through this energizing winding is completed only when the braking switch 47 and the field switch 48 are in open position. The arrangement of the contactor or auxiliary switch 39 in the starting circuit 37, is such relative to the operating rod 41 and the switches 47 and 48 that the switch 39 is closed only when the braking switch 47 and the field switch 48 are in open position.

While the system as hereinabove described has desirable interlocking and safety features, nevertheless, in order to further prevent undesirable operation or sequence of operations as to the connection of the motor 10 to the A. C. supply line for normal operating conditions and the connection of the motor to the braking resistance 46 for braking purposes, additional means may be provided for preventing the connection of the motor to the supply line while the secondary of the motor is connected to the braking circuit or the primary winding of the motor is connected to the direct current supply line. As a means to this end, the operating rod of the circuit-breaker 20 may be provided with a stop or projection 81 with which a latch 82 is cooperable, the latch being biased to such cooperative position and being capable of being withdrawn by an electromagnet having an energizing winding 83 whose circuit is completed through the auxiliary switch 39 only when the latter is in closed position as indicated. The operating rod 21 of the circuit-breaker 19 may also be provided with a stop or projection 85 having a centrally disposed recess 86 adapted to receive a latch 87, the latch being biased so as to drop within the recess 86 and being actuatable to withdrawn position by an electromagnet having an energizing winding 88 whose circuit is completed through the auxiliary switch 39 only when the latter is in closed position as indicated in the drawings.

The energizing circuit, through the controller C, for actuating the contactors 16, 16a may be normally closed through a contactor 91, biased to closed position, and actuatable to open position by an electromagnet having an energizing winding 92 whose circuit is closable through the contactor 72 or the contactor 61 or the contactor 58 of the safety switch, the operative connections described insuring the deenergization of the actuating electromagnets of the contactors 16, 16a, so as to reinsert the resistance sections 15, 15a in circuit whenever the safety switch is operated.

Assuming that the motor 10 is operating the mill 30 under ordinary conditions and that, because of accident or some other reason, it becomes necessary for an operator stationed at the mill to bring the latter to a stop in a relatively short interval of time. The operator actuates the safety switch by pulling down the actuating lever 56, which is located at a convenient point for operation by hand or foot, causing opening of the contactor 57 and closure of the contactor 58. Opening of the contactor 57 causes deenergization of the winding 59 and consequent closure of the contactor 61 which is in parallel with the contactor 58, thus giving double assurance that the safety features of the device will operate. With either contactor 58 or 61 closed, the energizing winding of the latch 34 on the circuit-breaker 20 is deenergized permitting the circuit-breaker to be tripped, thus throwing the motor off the A. C. supply line. As soon as this occurs, the energizing winding 73 of the actuating electromagnet of the contactor 71 is deenergized and the contactor 71 moves to closed position, with the consequent energization of the winding 68 and the resulting closure of the contactors 67 and 72. Closure of the contactor 67 causes energization of the winding 49 with consequent actuation of the braking switch 47 to closed position, the field switch 48 to closed position and the auxiliary switches 39 and 76 to open position. Closure of the contactor 67 also causes energization of the winding 51 with consequent actuation to closed position of the switch 50; and closure of this contactor 67 likewise causes energization of the winding 64 with consequent operation of the contactors 63 and 69 to open position after a time interval determined by the setting of the dash-pot or other time element 65.

Closure of the braking switch 47 and the field switches 48 and 50 permits direct current to be supplied to the primary winding of the motor 10, or one phase thereof, as indicated, the same acting as a direct current field exciting winding and with the secondary winding of the motor connected to the braking load resistance 46, the machine now operates as a synchronous type alternating current generator feeding power into the resistance 46, causing the machine to stop by reason of the dynamic braking effect produced.

The time interval in the opening of contactors 63 and 69 is so selected that these contactors are opened only after the motor has been brought to rest through dynamic braking. Opening of switch 63 causes deenergization of winding 51 controlling actuation of field switch 50, resulting in operation of this switch 50, as through a biasing spring, to open position, thus opening the direct current supply circuit for energizing the primary element of the motor, directly or through a current controlling resistance.

The parts of the control apparatus may be reset to normal position, as indicated, by operation of the push-button actuator to open contactor 70, in the shunt about contactor 69, thus breaking the circuit of energizing winding 68, with consequent opening of contactors 67 and 72, with further consequent deenergization of the windings 49 and 64. On deenergization of winding 69, the braking resistance switch 47 and the field switch 48 are moved by the biasing spring to open position, and auxiliary switches 39 and 76 are moved to closed position.

Due to the fact that the circuit of the energizing winding 27 of the holding latch 26 is completed through the auxiliary switch 76 associated with the operating rod 41, it will be apparent that the holding latch 26 is released and the circuit-breaker 19 permitted to return to open position, as soon as the circuit of the energizing winding 49 is completed, thus causing actuation of the switches 47 and 48 and the auxiliary switch 76. Through this arrangement, it becomes necessary to reset the circuit-breaker 19 whenever the motor has been stopped through dynamic braking caused through operation of the safety switch S.

It will be apparent that when the circuit-breaker 19 is in open position, recess 86 of the projection 85 on the operating rod 21 is alined with the latch 87, and unless the energizing winding 88 of this latch is energized through closure of the switch 39 associated with the operating rod 41, this closure occurring only when the switches 47 and 48 are in open position, the latch 87 will drop into the recess 86 and thus hold the circuit-breaker against actuation to either of its closed positions. By beveling the sides of the projection 85, the operating rod 21 is permitted to be shifted in either direction toward neutral position even though the latch 87 is in depressed condition.

When the circuit-breaker 20 is in open position, the stop or projection 81 thereon will cooperate with the latch 82 to hold the circuit-breaker against movement toward closed position, unless the energizing winding 83 of the latch is energized through closure of the auxiliary switch 39, as described hereinabove. Thus the circuit-breaker 20, as well as the circuit-breaker 19, may be positively held against movement to closed position, if the switches 47 and 48 are in closed position wherein they establish the braking circuits.

With the safety switch S of the non-return type, as indicated, it will be apparent that the operator, or some person from his position at the mill, must actuate the contactors 57 and 58 from the position occupied after actuation to secure stopping of the mill, in order to cause the closure of the energizing circuit of the electromagnetic holding latch 34 of the circuit-breaker 20. If the safety switch is not so returned to normal position, as indicated, it will be impossible to hold the circuit-breaker 20 in closed position and thus secure normal running of the motor. The fact that the normal running conditions of the motor cannot be established without the previous resetting of the safety switch S constitutes an indication that the motor has been previously stopped in response to operation of the safety switch, and insures at least some attention to the safety switch located adjacent the mill.

The circuit through the energizing windings of the actuating electromagnets of the contactors 16, 16a and the controller C may include a normally closed contactor 91 which is opened by an electromagnet having an energizing winding 92, whenever the motor is stopped in response to actuation of the safety switch S. Through this arrangement, it is insured that any short-circuit of resistance sections 15, 15a, present during normal running of the motor, is automatically removed during the dynamic braking of the motor.

It will be apparent that the contactors 57 and 58 of the safety switch S, instead of being actuated by the actuating lever or pedal 56, may be provided with an ordinary type of push-button actuation, wherein pressure on one push-button causes opening of contactor 57 and closure of contactor 58, and pressure on the other push-button causes the reverse operation of these contactors.

It will be apparent that the safety switch S with its operating means may be duplicated at any one or more points so as to permit a person to stop the motor from any of such points.

Figure 2:
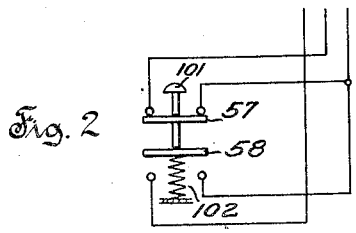
Fig. 2 is a diagrammatic disclosure of a modification of a detail of the control system of Fig. 1.

For certain purposes, it may be desirable to have the safety switch S, located convenient to the mill or other remote point, of such type that it will automatically return to normal position after having once been operated. In accordance with the diagrammatic disclosure of Fig. 2, the contactors 57 and 58 may be mounted for common actuation by a push-button 101, a spring 102 being provided for biasing these contacts to the position indicated and for returning the same to such position when the push-button has been relieved of operating pressure. Likewise, the safety switch arrangement of Fig. 1 may be modified to the extent of providing a spring or other return means to insure return of the contactors 57 and 58 to the position indicated when the actuating lever 56 has been relieved of operating pressure. Where the safety switch S is of the non-return type, the contactor 72, in shunt to the contactors 58 and 61, serves to maintain the desired operating circuits during the braking operation.

It should be understood that the invention claimed is not limited to the exact details of construction and design shown and described herein; but it is contemplated that the claimed invention shall include such various modifications of the system and details herein disclosed and applications thereof as may be apparent to one skilled in the art.

It is claimed and desired to secure by Letters Patent:

1. In combination, a motor comprising stator and rotor windings and operative to drive a load, circuit-controlling means between said motor and a supply line, means for holding said circuit-controlling means in operative position, an electrical load element, a switching device for connecting one of said motor windings to said electrical load element for braking purposes and capable of operation under certain conditions independently of said circuit-controlling means, means for maintaining said circuit-controlling means in inoperative position while said motor winding is connected to said electrical load, and means for causing the actuation of said switching device to inoperative position and the release of said maintaining means.

2. In combination, a motor comprising stator and rotor elements and operative to drive a load, circuit-controlling means between one of said elements of the motor and a supply line, an electrical load element, a switching device for connecting one of said elements of the motor to said electrical load element for braking purposes, means for causing actuation of said switching device, means for preventing operation of said circuit-controlling means to closed position while said switching device is in position to connect said latter element of the motor to said electrical load element, and means operable from a point removed from said circuit-controlling means for rendering said preventing means inoperative.

3. In combination, a motor operative to drive a load, circuit-controlling means between one element of said motor and a supply line, said circuit-controlling means being biased to inoperative position, means for holding said circuit-controlling means in operative position, an electrical load element, a switching device operative to establish a connection between one element of said motor and said electrical load element for purposes of dynamically braking said motor, an electro-magnetically operated device for actuating said switching device, and means operatively dependent upon said circuit-controlling means for insuring energization of said electro-magnetic device to cause actuation of said switching device to inoperative position when said circuit-controlling means is actuated to inoperative position, and means operable from a remote point at the will of an operator for insuring that said circuit-controlling means is held in inoperative position after actuation of said switching device to operative position for effecting dynamic braking.

4. In combination, a motor operative to drive a load, controlling means for said motor comprising a switching device biased to open position and operative in closed position to connect said motor to a supply line, means for effecting dynamic braking of said motor, means cooperative with said switching device for maintaining the latter in closed position to insure normal operation of said motor, said maintaining means being inoperative subsequent to a dynamic braking operation of the motor, and means remote from said switching device for controlling said maintaining means.

5. In combination, an alternating current motor operative to drive a load, an electrical braking load, means for controlling the connection of said motor to a supply line for normal running purposes and to a source of direct current energization and to said braking load for braking purposes, means operative from a remote point for effecting the disconnection of said motor from said supply line and the connection of said motor to said source of direct current energization and to said braking load for purposes of braking said motor, and means operative only from a point adjacent the driven load for preventing effective operative connection of said motor to the supply line subsequent to a braking operation of the motor.

6. In combination, an induction motor operative to drive a load, circuit-controlling means biased to open position and operative to effectively connect the primary of said motor to an alternating current supply line, low-voltage release means for holding said circuit-controlling means in closed position, an electrical load circuit, switching means for effectively connecting the secondary of said motor to said electrical load and said primary to a source of direct current, an electrically operated device for causing actuation of said switching means, means operatively dependent upon said circuit-controlling means for insuring energization of said electrically operated device to cause actuation of said switching means to closed circuit condition only when said circuit-controlling means is in open position, means for insuring that said circuit-controlling means is held in inoperative position at all times while said switching means is in closed position, and means operative to actuate said low-voltage release and to cause the actuation of said switching means to closed position.

7. In combination, an induction motor operative to drive a load, circuit-controlling means biased to open position and operative to connect the primary of said motor to a supply circuit for normal running, means for releasably holding said circuit-controlling means in operative position corresponding to normal running, an electrical load, means for connecting the secondary of said motor to said electrical load and the primary of said motor to a source of direct current, and means for insuring that said holding means is ineffective to cause said circuit-controlling means to maintain normal running conditions when said connecting means are in closed position.

8. In combination, an induction motor operative to drive a load, circuit-controlling means biased to open position and operative to connect the primary of said motor to a supply circuit for normal running, means for holding said circuit-controlling means in closed position, means operable to cause release of said holding means, an electrical load, means adapted to connect the secondary of said motor to said electrical load and the primary of said motor to a source of direct current to effect dynamic braking of said motor, electromagnetically controlled means for causing actuation of said connecting means, and means operatively dependent upon said circuit-controlling means for permitting effective energization of said electromagnetically controlled means to cause actuation of said connecting means to open position only when said circuit-controlling means is in open position.

9. In combination, an induction motor operative to drive a load, circuit-controlling means biased to open position and operative to connect the armature of said motor directly to a supply circuit for normal running purposes, means for holding said circuit-controlling means in closed position, said holding means including a latch of the low-voltage release type, an electrical load circuit, a switching device for connecting the secondary of said motor to said load circuit and the armature of said motor to a direct current source for braking purposes, electromagnetically actuated means for causing the operation of said switching device and effective to insure opening movement of said switching device only when said circuit-controlling means is in open position, and means for insuring that said circuit-controlling means is held in open position while the secondary of said motor is connected to said load circuit, said insuring means comprising a stop associated with said circuit-controlling means, an electromagnetically controlled latch cooperative with said stop, and a switch operatively associated with said switching device and operative to cause release of said latch only when said switching device is in open position.

10. In combination, an alternating current motor comprising stator and rotor elements and operative to drive a load, circuit-controlling means operative to connect the stator of said motor to a supply circuit for normal running purposes, means for holding said circuit-controlling means in closed position, means operative to cause release of said holding means, an electrical load adapted to serve for braking purposes, a switching device for connecting one element of said motor to said electrical load, electromagnetically controlled means for causing actuation of said switching device, means operatively dependent upon said circuit-controlling means for permitting closing of said switching device only when said circuit-controlling means is in open position, and means for insuring that said circuit-controlling means is inoperative to maintain normal running conditions of said motor while said switching device is in closed position.

11. In combination, an alternating current motor operative to drive a load, controlling means for said motor comprising a switching device operative to connect said motor to a supply line for normal operation, means for effecting dynamic braking of said motor, means for preventing operation of said switching device to a position wherein it effectively connects said motor to said supply line for normal running conditions subsequent to a dynamic braking operation of said motor, and means actuatable from a point remote from said switching device for controlling the effectiveness of said preventing means.

In testimony whereof the signature of the inventor is affixed hereto.

HENRY V. NYE.